(12) United States Patent  
Bulekbay et al.

(10) Patent No.: US 10,066,150 B1
(45) Date of Patent: Sep. 4, 2018

(54) ENHANCING ACID FRACTURE CONDUCTIVITY

(71) Applicant: Saudi Arabian Oil Company, Dhahran (SA)

(72) Inventors: Aslan Bulekbay, Udhailiyah (SA); Ahmed M. Gomaa, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/595,108

(22) Filed: May 15, 2017

(51) Int. Cl.
| E21B 21/14 | (2006.01) |
| E21B 43/26 | (2006.01) |
| C09K 8/68 | (2006.01) |
| E21B 43/267 | (2006.01) |
| C09K 8/70 | (2006.01) |
| C09K 8/72 | (2006.01) |
| C09K 8/74 | (2006.01) |
| C09K 8/04 | (2006.01) |

(52) U.S. Cl.
CPC ............... C09K 8/68 (2013.01); C09K 8/04 (2013.01); C09K 8/703 (2013.01); C09K 8/706 (2013.01); C09K 8/72 (2013.01); C09K 8/74 (2013.01); E21B 43/267 (2013.01); C09K 2208/30 (2013.01)

(58) Field of Classification Search
CPC ...... E21B 43/26; E21B 43/166; E21B 43/168; E21B 21/14; C09K 8/62; C09K 8/72; C09K 8/703; C09K 8/70
See application file for complete search history.

(56) References Cited

U.S. PATENT DOCUMENTS

| 3,937,283 A | 2/1976 | Blauer et al. |
| 3,980,136 A | 9/1976 | Plummer et al. |
| 4,044,833 A | 8/1977 | Volz |
| 4,846,277 A | 7/1989 | Khalil et al. |
| 5,069,283 A | 12/1991 | Mack |
| 5,529,123 A | 6/1996 | Carpenter et al. |
| 6,207,620 B1 | 3/2001 | Gonzalez et al. |
| 6,729,409 B1 | 5/2004 | Gupta et al. |
| 7,001,872 B2 | 2/2006 | Pyecroft et al. |
| 7,134,497 B1 | 11/2006 | Chatterji et al. |

(Continued)

OTHER PUBLICATIONS

Gomaa et al., "Acid Fracturing: The Effect of Formation Strength on Fracture Conductivity," Paper SPE 119623 presented at the SPE Hydraulic Fracturing Technology Conference, Jan. 2009, 18 pages.

(Continued)

*Primary Examiner* — Catherine Loikith
(74) *Attorney, Agent, or Firm* — Fish & Richardson P.C.

(57) ABSTRACT

Methods and systems for enhancing acid fracture conductivity of acid fracture treatments on subterranean formations are provided. An example method of acid fracture treatment includes initiating fracturing of a subterranean formation in which a wellbore is formed to create a formation fracture, after initiating the fracturing for a period of time, injecting an acidic fluid into the wellbore to etch walls of the formation fracture to thereby create fracture conductivity, introducing a gas into the wellbore to foam fluids in the wellbore, and increasing a foam quality of the fluids with time during the treatment. The foam quality is based on a volume of the introduced gas and a total volume of the fluids in the wellbore.

26 Claims, 5 Drawing Sheets

(56) References Cited

U.S. PATENT DOCUMENTS

| | | |
|---|---|---|
| 7,426,961 B2 | 9/2008 | Stephenson et al. |
| 7,610,962 B2 | 11/2009 | Fowler |
| 7,767,628 B2 | 8/2010 | Kippie et al. |
| 8,763,699 B2 | 7/2014 | Medvedev et al. |
| 2005/0137094 A1 | 6/2005 | Weaver et al. |
| 2006/0073980 A1 | 4/2006 | Brannon et al. |
| 2009/0151944 A1* | 6/2009 | Fuller .............. C09K 8/536 166/280.2 |
| 2009/0298720 A1 | 12/2009 | Nguyen et al. |

OTHER PUBLICATIONS

Williams et al., "Acidizing Fundamentals," Society of Petroleum Engineers of AIME, Jan. 1979, 131 pages.

* cited by examiner

ENHANCING ACID FRACTURE CONDUCTIVITY

TECHNICAL FIELD

This specification relates to fracturing methods for subterranean formations, particularly to acid fracture treatments.

BACKGROUND

Various methods including proppant fracturing and acid fracturing can be used to fracture a subterranean formation to increase gross permeability or conductivity and enhance production of fluids therefrom. In proppant fracturing, a propping agent is used to keep a fracture open after a fracturing treatment. In acid fracturing, acid is used to etch channels in a formation rock that forms walls of a fracture, and the rock can be partially soluble in the acid so that the channels can be etched in the fractured walls.

SUMMARY

The present specification describes methods and systems for enhancing acid fracture conductivity of acid fracture treatments on subterranean formations.

One aspect of the present disclosure features a method of acid fracture treatment, including: initiating fracturing of a subterranean formation in which a wellbore is formed to create a formation fracture; after initiating the fracturing for a period of time, injecting an acidic fluid into the wellbore to etch walls of the formation fracture to thereby create fracture conductivity; introducing a gas into the wellbore to foam fluids in the wellbore; and increasing a foam quality of the fluids with time during the treatment, wherein the foam quality is based on a volume of the introduced gas and a volume of the fluids in the wellbore.

In some implementations, the method further includes: monitoring reaction of the fracture to the acidic fluid during the treatment; and controlling the increasing of the foam quality based on the monitored reaction by adjusting at least one of an injection rate of the acidic fluid, an injection volume of the acidic fluid, an introduction rate of the gas, or an introduction volume of the gas. In some cases, monitoring reaction of the fracture can include monitoring at least one of parameters including a treating pressure, a wellhead pressure, a bottomhole pressure, a fluid pumping rate, a gas pumping rate, and a slurry rate; and determining the reaction of the fracture based on the monitored parameters.

In some implementations, the method further includes: calculating the foam quality based on the volume of the introduced gas and the volume of the fluids in the wellbore; and correcting the calculated foam quality with at least one of a calculated wellhead foam quality, a predicted bottomhole foam quality, or a calculated actual bottomhole foam quality. The method can further include: calculating the calculated wellhead foam quality based on an actual wellhead pressure and a temperature; predicting the predicted bottomhole foam quality based on a predicted bottomhole internal phase; and calculating the calculated actual bottomhole foam quality based on a calculated bottomhole internal phase that is calculated based on a bottomhole pressure and the temperature.

The method can further include determining that a dimension of the created formation fracture reaches a value, and in response, injecting the acidic fluid into the wellbore. Introducing the gas can include introducing the gas after the creation of the formation fracture and until completion of the treatment. Introducing a gas into the wellbore can include generating the gas in-situ in the fluids in the wellbore. The method can further include decreasing an injection rate of the acidic fluid with time during the treatment.

In some implementations, injecting the acidic fluid includes injecting the acidic fluid at a pressure lower than a fracture closure pressure that is capable of causing a closure of the formation fracture. In some cases, injecting the acidic fluid includes keeping an injection rate of the acidic fluid constant with time during the treatment. In some cases, injecting the acidic fluid includes increasing an injection rate of the acidic fluid with time during the treatment.

In some implementations, initiating the fracturing includes flowing a fracturing pad fluid into the wellbore to break down the formation to thereby create the formation fracture. The method can include alternately performing steps of injecting the fracturing pad fluid and the acidic fluid, while keeping introducing the gas during the steps. In some cases, a volume of the introduced gas for a current step is no smaller than a volume of the introduced gas for a previous step. In some cases, a volume of the introduced gas for a current step is smaller than a volume of the introduced gas for a previous step. In some cases, an injection rate of the introduced gas for a current step is no smaller than an injection rate of the introduced gas for a previous step. The fracturing pad fluid can include at least one of a gelled water or a crosslinked gel fluid.

In some examples, the acidic fluid is configured to dissolve the formation and can includes at least one of: hydrochloric (HCl) acid with a concentration from 0.1 to 32 wt. %, formic acid with a concentration from 0.1 to 12 wt. %, acetic acid with a concentration from 0.1 to 20 wt. %, methaneseleninic (MSA) acid with a concentration from 0.1 to 92 wt. %, chelating agent with a concentration from 0.1 to 40 wt. %, or a carboxylic acid system. The acidic fluid can be configured to be gelled by linearly polymers, gelled by crosslinked polymer system, gelled by viscoelastic surfactant (VES) system, emulsified by diesel or oil, or foamed by a particular gas.

In some examples, the introduced gas has low density and low viscosity and includes at least one of: nitrogen ($N_2$), carbon dioxide ($CO_2$), air, methane, or natural gas. The method can further include adding a diversion fluid to the acidic fluid, and the diversion fluid can include at least one of a crosslinking polymer, a surfactant based material, or a crosslinked non-reactive fluid. The method can further include cleaning the wellbore after closure of the formation fracture.

Another aspect of the present disclosure features a method of acid fracture treatment, including: initiating fracturing of a subterranean formation in which a wellbore is formed to create a formation fracture; after initiating the fracturing for a period of time, injecting an acidic fluid into the wellbore to etch walls of the formation fracture to thereby create fracture conductivity; introducing into the wellbore an acidic retard system configured to reduce reactivity of the acidic fluid in the wellbore; monitoring reaction of the fracture to the acidic fluid and the acidic retard system during the treatment; and controlling a foam quality of fluids in the wellbore based on the monitored reaction, wherein the foam quality is based on the introduced acidic retard system.

Controlling a foam quality of fluids in the wellbore can include increasing the foam quality with time during the treatment. In some cases, controlling a foam quality of fluids in the wellbore includes adjusting at least one of an injection rate of the acidic fluid, an injection volume of the acidic fluid, an introduction rate of the acidic retard system, an introduction volume of the acidic retard system, or an introduction concentration of an acidic retard agent in the acidic retard system. The acidic retard system can include an acidic retard agent that includes at least one of: a gas with low density and low viscosity, linearly polymer, crosslinked polymer system, viscoelastic surfactant (VES) system, or diesel or oil.

The details of one or more implementations of the subject matter of this specification are set forth in the accompanying drawings and associated description. Other features, aspects, and advantages of the subject matter will become apparent from the description, the drawings, and the claims.

DETAILED DESCRIPTION

Figure 1:
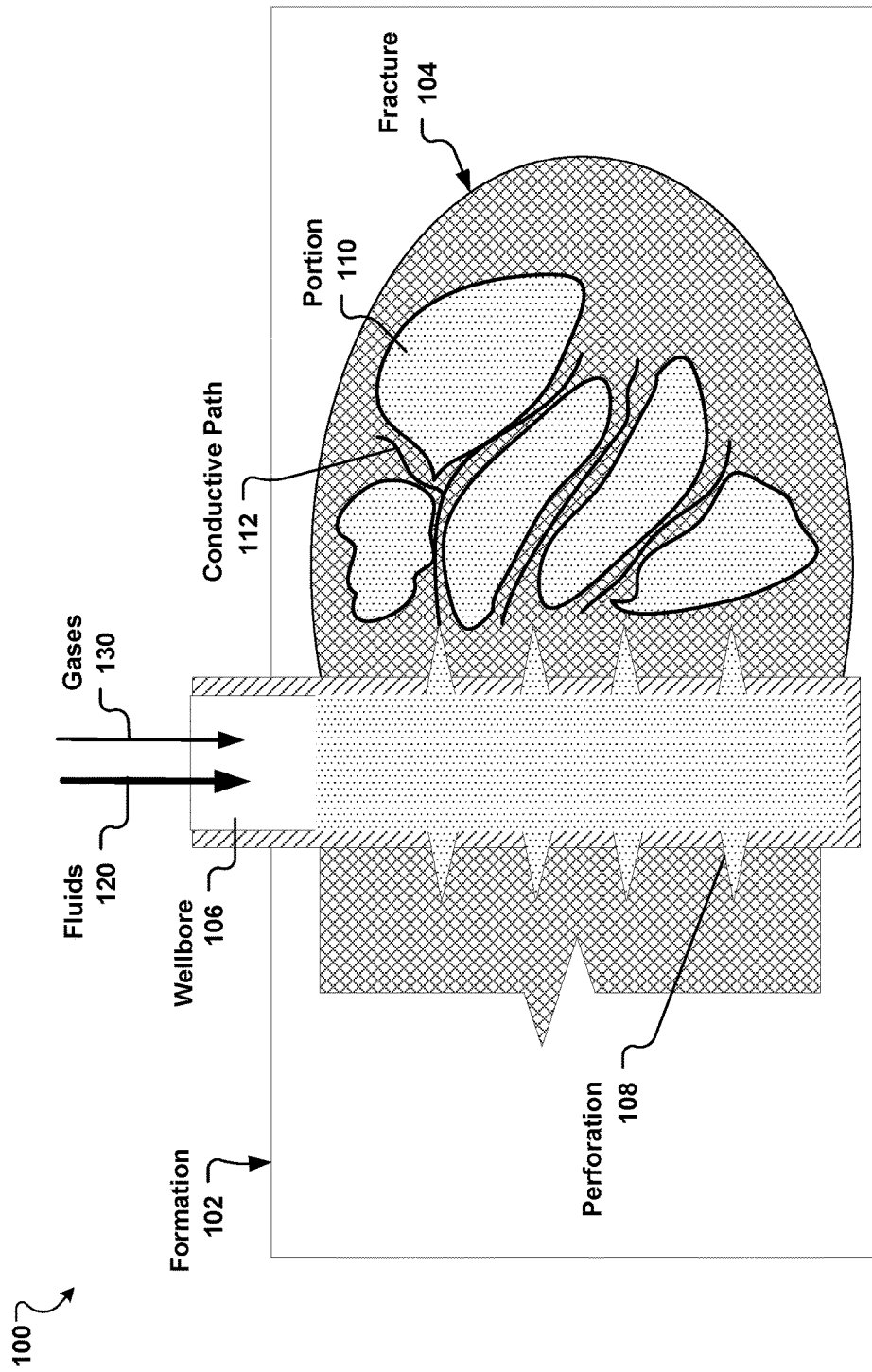
FIG. 1 is a schematic diagram illustrating a sectional view of a formation penetrated with a wellbore in an acid fracture treatment.

FIG. 1 is a schematic diagram illustrating a sectional view 100 of a subterranean formation 102 penetrated with a wellbore 106 in an acid fracture treatment (or acid fracturing). The formation 102 can be a carbonate-containing formation. The wellbore 106 can include perforations 108 that extends into the formation 102. Fluids 120 can be injected (or pumped) into the wellbore 106 and flowed into the formation 102 through the perforations 108.

In the acid fracture treatment, a fracturing pad fluid can first be injected into the wellbore 106 to break down the formation 102 to thereby create one or more formation fractures 104. Then, an acidic fluid can be injected into the wellbore 106 to etch walls of the fracture 104, for example, surfaces of a formation rock, to create fracture conductivity, for example, to create conducive paths 112, between fracture portions 110 of the fractures 104. The rock can include calcite, limestone or dolomite. In some implementations, gases 130 such as Nitrogen ($N_2$) can be also introduced (pumped or generated in situ) into the wellbore 106 to foam the fluids in the wellbore 106 during the acid fracture treatment.

The success of an acid fracture treatment may depend on the created fracture conductivity being retained under a fracture closure pressure (or stress). Fracture conductivity can be a competition between two phenomena: etching of a rock surface in a formation and weakening of a rock strength by the acid. Under the fracture closure pressure, in addition to uneven etching, fracture conductivity can depend on the ability of asperities (or harshness) of the rock to maintain mechanical integrity. The final conductivity of the fracture depends on factors that create the conductive path and those maintaining the fracture open under the fracture closure pressure.

A first step of an acid fracture treatment is to create a conductive path in a rock of a formation, where a number of parameters can be used, including acid concentration, soaking time, different acid systems, and additives. A second step of the acid fracture treatment is to keep the conductive path open, which can depend on the remaining hardness of asperities of the rock. As hardness of the asperities increase, the conductivity will be maintained. Therefore, it is desirable to optimize parameters to maintain the hardness of the rock.

Acid can be gelled, crosslinked, or emulsified to maintain fracture width and minimize fluid leakoff, and acid fracturing can be applied in shallow, low-temperature carbonate reservoirs, in which a reservoir temperature can be less than 200° F. and a maximum effective stress on the fracture can be less than 5,000 psi. Low temperature reduces a reaction rate between the acid and the formation, which allows the acid to penetrate deeper into the fracture before becoming consumed. For example, limestone reservoirs are ductile, and a low effective stress on the fracture is required to maintain adequate fracture conductivity over the life of the well. In deep limestone reservoirs, high bottom-hole temperature and high effective stress are applied on the fracture, which makes it hard to stimulate the formation.

Figure 2:
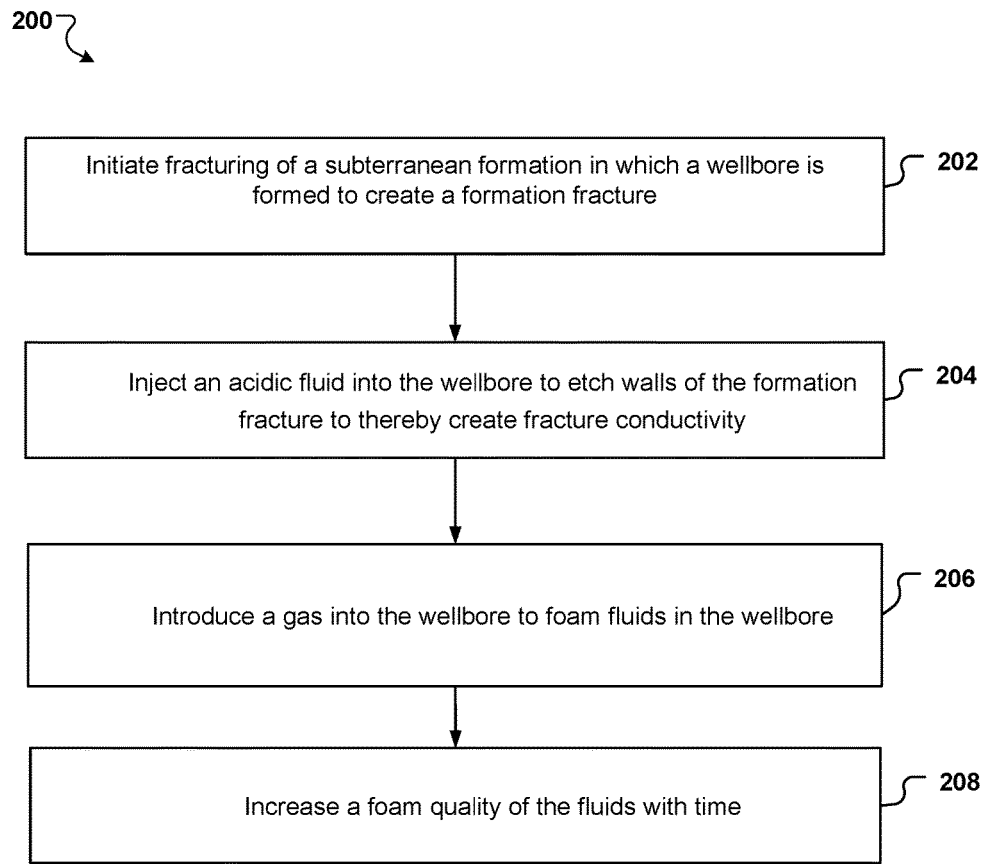
FIG. 2 is a flowchart of an example process of an acid fracture treatment with gas foaming.

FIG. 2 shows an example process 200 of an acid fracture treatment with gas foaming, where a gas is injected into liquids in a wellbore to form foams. A foam is a dispersion of gas in a liquid, which can be stabilized by inclusion of a surfactant foaming agent. The liquid can be water, acid, hydrocarbon such as diesel, or a mixture of water/hydrocarbon or acid/hydrocarbon. The gas, or internal phase, can be any gas available. In some cases, the gas has low density and low viscosity, for example, nitrogen ($N_2$), carbon dioxide ($CO_2$), air, methane, or natural gas. The foams can be homogenous mixtures within a range of bubble sizes, for example, under 200 microns. Interaction between bubbles can be structured (or configured) to create a foam with a high quality, for example, with a foam quality above 53%. The foams can be stable for a period of time, for example, several hours. The foams can offer various advantages, for example, high sand carrying and suspension capacity, low filtration loss, low hydrostatic pressure, low pressure drop by friction, fast fluid recovery, low formation damage, and absence of fracture conductivity reduction due to fluid ingredients. Thus, the acid fracture treatment with gas foaming enables to enhance conductivity of an acid fractured wellbore, for example, in a high temperature-high stress-depleted carbonate formation.

Fracturing of a subterranean formation is initiated to create a formation fracture (202). A wellbore can be formed in the formation. The formation, the fracture, and the wellbore can be the formation 102, the fracture 104, and the wellbore 106 of FIG. 1, respectively.

In some cases, initiating the fracturing can include cooling down the wellbore, for example, with treated water, and then injecting an initial fracturing fluid to provide initial penetration into the formation during a spearhead step. The treated water can be water mixed with surfactant and clay control agent. In some cases, the treated water can include completion fluid and Brines. The initial fracturing fluid can include an acid with a relatively low viscosity, for example, 26% hydrochloric acid (HCl).

After the spearhead step, a fracturing pad fluid can be injected into the wellbore to break down the formation to thereby create the formation fracture. The fracturing pad fluid can include no acid. In some examples, the fracturing pad fluid is a water-based pad, for example, a gelled water or a crosslinked gel fluid. The fracturing pad fluid can include delayed borate, zirconium, or titanium xlinked fluid system.

After initiating the fracturing for a period of time, an acidic fluid is injected into the wellbore to etch walls of the formation fracture to thereby create fracture conductivity (204).

In some implementations, the process 200 includes determining that a dimension of the created formation fracture reaches a value, and in response, injecting the acidic fluid into the wellbore. In some examples, the dimension of the formation fracture can be measured or determined by distributed temperature survey, for example, using fiber optic with resistivity measurements in real time coupled with a fracture pressure matching. In some examples, a seismic and mathematical model can be used to predict fracture dimension. The pad fluid can be pumped into the wellbore to create the fracture with a desired height, width, length, or any suitable combination therefrom. In a particular example, the created fracture has a volume that is around 10-20% of a total pumped volume of the pad fluid.

The acidic fluid can include any fluid capable of etching or dissolving rocks, for example, an acid fluid. The acidic fluid can be gelled, crosslinked, or emulsified to maintain the fracture width, to minimize fluid leakoff and to have a good retardation for deep acid penetration.

In some examples, hydrochloric acid (HCl) at a concentration range of 15-28 wt. % is used to obtain deep acid penetration and large etching. In some cases, formic acid (HCOOH) or acetic acid ($CH_3COOH$) is used for a higher temperature application when HCl is not recommended for use because of its fast reactivity and high corrosively at high temperature. In a particular example, the acid fluid includes high temperature emulsified acid system with an acid concentration of 28.0 wt. %.

In some examples, the acidic fluid includes at least one of: hydrochloric (HCl) acid with a concentration from 0.1 to 32 wt. %, formic acid with a concentration from 0.1 to 12 wt. %, acetic acid with a concentration from 0.1 to 20 wt. %, methaneseleninic (MSA) acid with a concentration from 0.1 to 92 wt. %, chelating agent with a concentration from 0.1 to 40 wt. %, or a carboxylic acid system. The chelating agent can include L-glutamic acid-N, N-diacetic acid (GLDA), ethylenediaminetetraacetic acid (EDTA), methylglycinediacetic acid (MGDA), hydroxy ethylethylenediaminetetraacetic acid (HEDTA), or diethylenetriaminepentaacetic acid (DTPA). The carboxylic acid system can include a single carboxylic acid system, a di-carboxylic acid system, a tri-carboxylic acid system, or a tetra-carboxylic acid system. The acidic fluid can also include any other acid systems (for example, mineral or organic). The acidic fluid can include a mixture of two or more of the above acid systems at different concentrations.

The acidic fluid can be also gelled by linearly polymers (for example, synthetic polymer like polyacrylamide (PAM), biopolymer like Guar, carboxymethyl hydroxypropyl guar (CHMBG) or terpolymer), gelled by crosslinked polymer system (for example, synthetic like PAM, biopolymer like CHMBG, or terpolymer), gelled by viscoelastic surfactant (VES) system, emulsified by diesel or oil (for example, at different qualities), or foamed by a particular gas such as nitrogen ($N_2$), carbon dioxide ($CO_2$), air, methane, or natural gas. In a particular example, the emulsified acid includes 30 vol % diesel and 70 vol % HCl solutions.

As the acidic fluid is reactive with the formation, a diversion fluid (a diverter or a diversion agent) can be added to the acidic fluid to minimize fluid leakoff inside the formation and keep the acid reaction with fracture faces. Particularly, the diversion fluid can be used in high permeability and naturally fractured carbonate formations, where long etched fractures are difficult to obtain. Diversion can be obtained by gelling the acid using crosslinking and polymer, or using a surfactant based material. A crosslinked non-reactive fluid can be also used as the diversion fluid. In a particular example, the diversion fluid includes encapsulated weak organic acids with an acid concentration of 15.0% or viscoelastic surfactants (VES).

A gas is introduced into the wellbore to foam fluids in the wellbore (206). The gas can be introduced throughout the treatment, for example, after the creation of the formation fracture and until completion of the treatment.

Figure 4A:
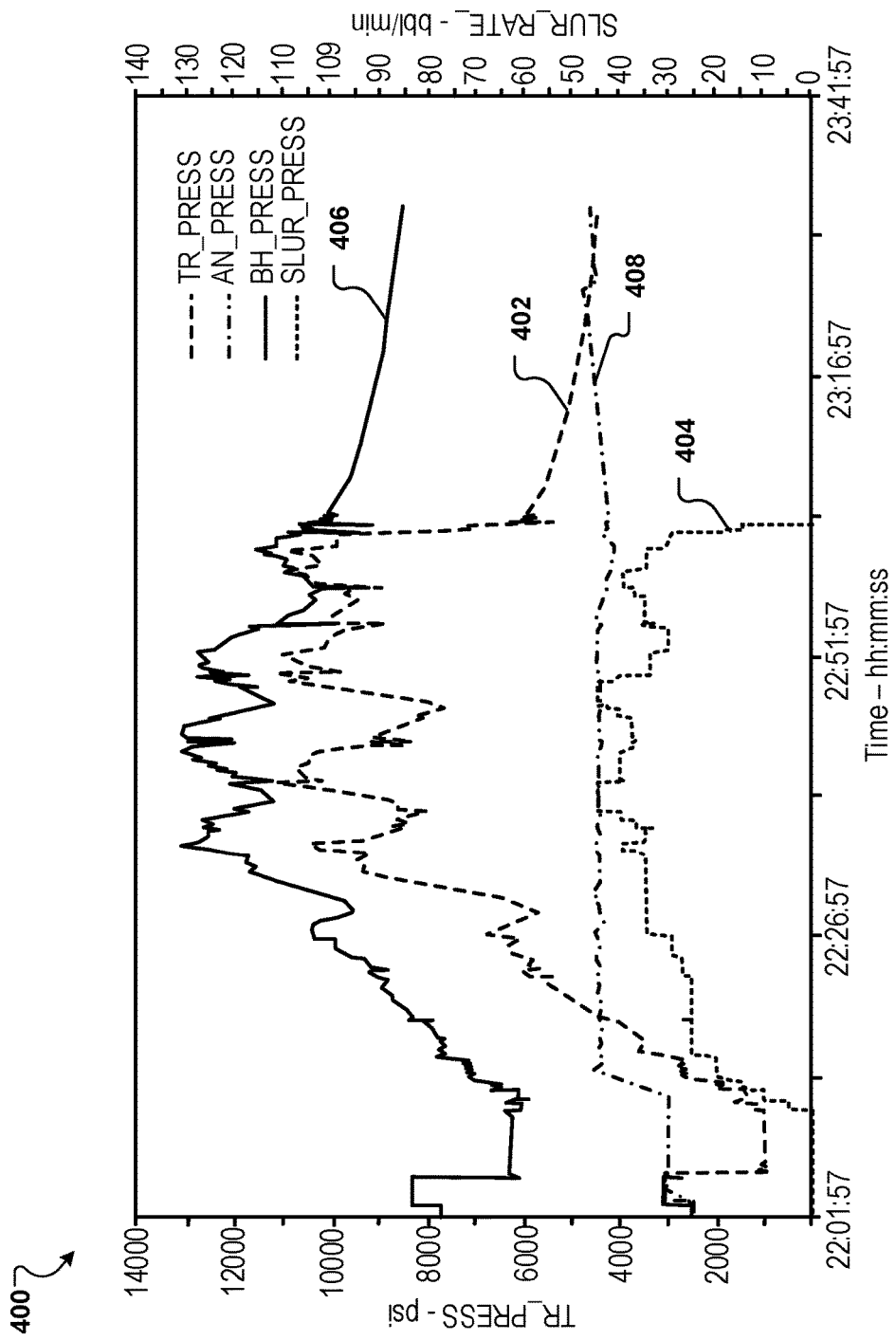
FIG. 4A shows an example time diagram of an acid fracture treatment without gas foaming.
Figure 4B:
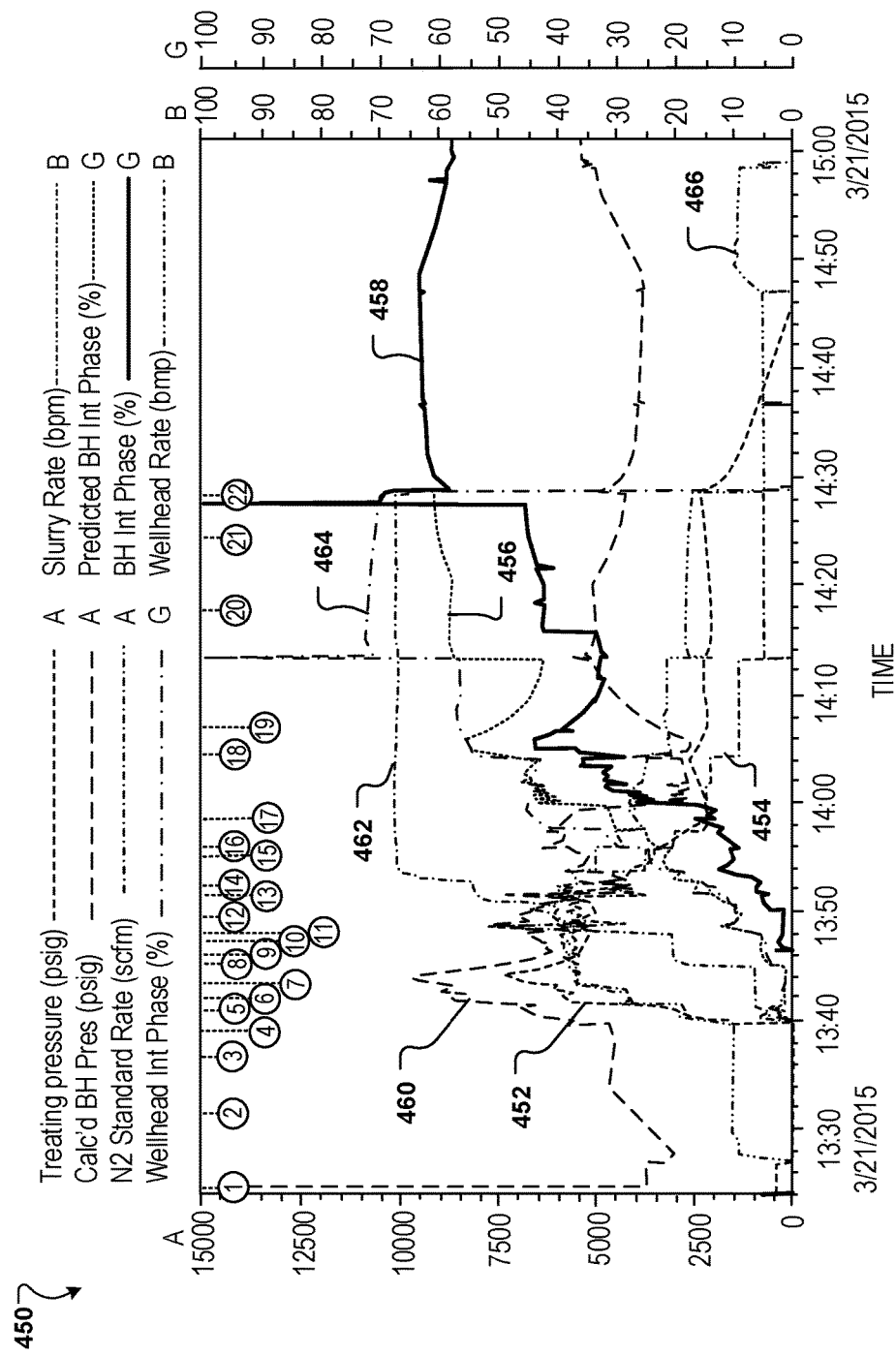
FIG. 4B shows an example time diagram of an acid fracture treatment with gas foaming.

In some implementations, introducing the gas into the wellbore includes injecting or pumping the gas continuously (for example, from a cryogenic cylinder from a wellhead) into the wellbore. The gas can be injected under a treating (or treatment) pressure, as illustrated in FIG. 4B. In some implementations, the gas is pulsed into the fluids, for examples, as multiple bubbles or gas slugs.

In some implementations, introducing the gas into the wellbore includes generating the gas in-situ in the fluids in the wellbore. For example, nitrogen gas can be generated by chemical reaction between aqueous solutions of nitrogen salts, such as reacting zinc metal with HCl or aluminum with NaOH solution.

A foam quality of the fluids is increased with time during the treatment (208). The foam quality can be based on a volume of the introduced gas and a total volume of the fluids in the wellbore. In some examples, the foam quality (Fm) is defined as a ratio between a volume Vg of gas in a dispersed phase and a total foam volume Vt, as follows:

$$Fm=Vg/Vt=Vg/(Vg+Vl),$$

where the total foam volume Vt represents the aggregate volume of the gas and liquid which form the foams and Vl represents a volume of the liquids for forming the foams. In some cases, Vg can be a total volume of the introduced gas. In some cases, Vl can be a total volume of the fluids injected in the wellbore, including the pad fluid, the acid fluid, the diverter, and the flushing fluid. The foam quality can be also noted as a Mitchell foam quality.

The foam quality can be further corrected with a wellhead pressure, a downhole (or bottomhole) pressure, and/or temperature modelling in real-time accordingly. In some cases, during the treatment, at least three types of foam qualities can be monitored, including a wellhead foam quality, a predicted downhole (or bottomhole) foam quality, and a calculated real-time actual downhole foam quality. A corrected foam quality can be determined based on the foam qualities. The foam quality can be monitored, measured, and adjusted. In some cases, the foam quality can be determined empirically. In some cases, a foam loop test can be performed to identify the foam quality and adjust it accordingly.

During the treatment, the foam quality can be controlled to increase with time, for example, from 0 to 80%. The process 200 can include monitoring reaction of the fracture to the acidic fluid during the treatment, and controlling the foam quality based on the monitored reaction, for example, by adjusting at least one of an injection rate of the acidic fluid, an injection volume of the acidic fluid, an introduction rate of the gas, or an introduction volume of the gas. The foam quality can be also controlled by adjusting at least one of an injection rate of the pad fluid, an injection volume of the pad fluid, an injection rate of the diversion fluid, or an injection volume of the diversion fluid. In some examples, the reaction of the fracture can be monitored in real time by monitoring a treating pressure, a wellhead pressure, a bottomhole (or downhole) pressure, a bottomhole internal phase, a liquid (or fluid) pumping rate, a gas pumping rate, or a slurry rate, as illustrated in FIGS. 4A-4B. For example, a sharp substantial pressure drop of the treating pressure at constant or increasing liquid pumping rate after formation breakdown can indirectly indicate high leakoff in the formation.

The process 200 can include alternately performing steps of injecting the fracturing pad fluid, the acidic fluid, and the diversion fluid in any suitable order, while keeping introducing the gas during the steps. The injection rate of the introduced gas for a current step can be no smaller than (larger than or identical to) an injection rate of the introduced gas for a previous step. In some cases, a volume of the introduced gas for a current step can be no smaller than (larger than or identical to) a volume of the introduced gas for a previous step. In some cases, a volume of the introduced gas for a current step can be smaller than a volume of the introduced gas for a previous step.

In some cases, during the treatment, the introduction rate of the gas is kept increasing with time, for example, from 4,000 standard cubic feet per minute (scf/min or scfm) to 8,000 scf/min. The introduction volume of the $N_2$ gases in each step of the treatment can vary within a range, for example, from 44 Gallons to 2330 Gallons. In any cases, the foam quality is controlled to increase with time during the steps.

The injection rate of the acidic fluid can be reduced (or decreased) with time during the treatment, which can lead to achieve fracture closure during a main acid treatment and a majority of the acid can be consumed while the fracture is closed. Injecting the acidic fluid can include injecting the acidic fluid at a pressure lower than a fracture closure pressure that is capable of causing a closure of the formation fracture. In some cases, the injection rate of the acidic fluid can be kept constant with time during the treatment. In some cases, the injection rate of the acidic fluid can be also increased with time during the treatment.

The process 200 can include cleaning the wellbore after closure of the formation fracture, for example, by flowing a flushing fluid. The flushing fluid can include no acid, such as treated water. The treatment can include an overflush step and a final flush step. During the overflush step, a larger volume of the flushing fluid can be displaced deeper into a reservoir. During the final flush step, a smaller volume of the flushing fluid is mainly displaced within the wellbore. The gas can be kept introduced into the wellbore during the cleaning the wellbore.

Figure 3:
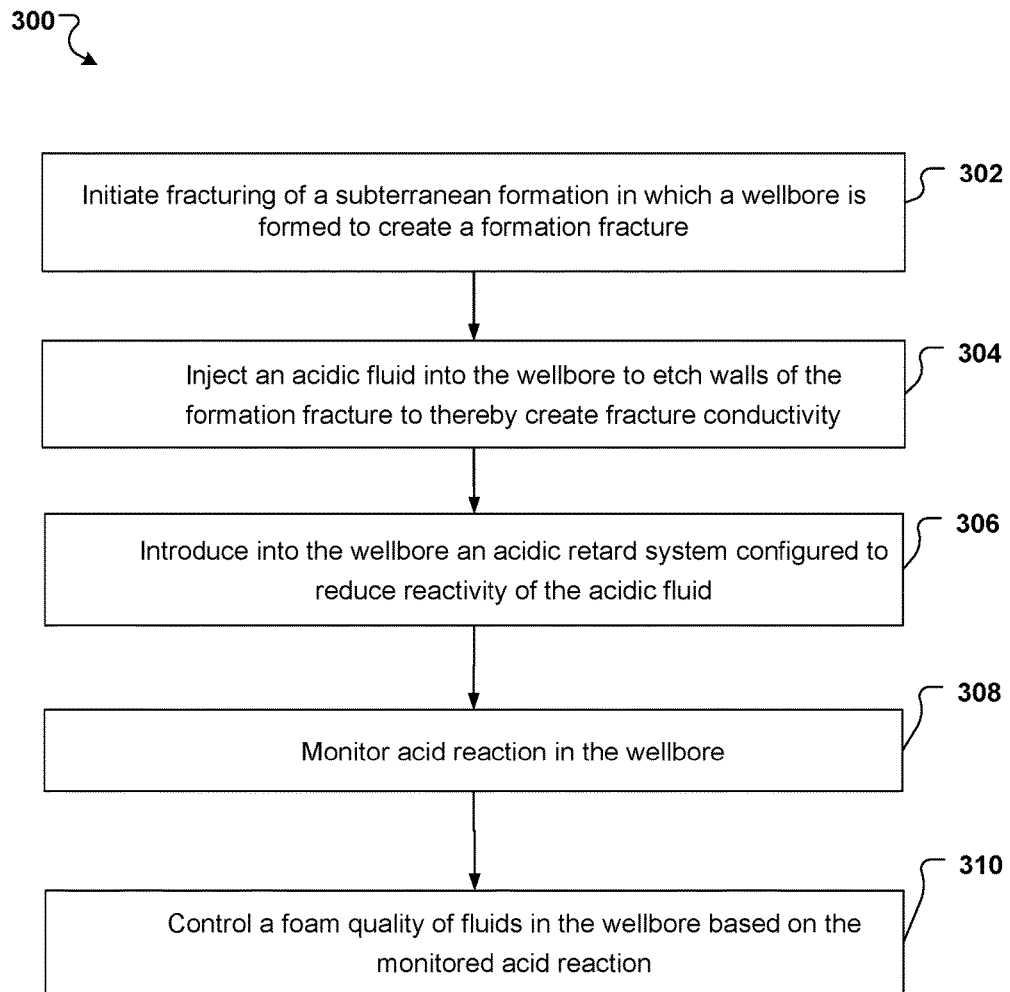
FIG. 3 is a flowchart of another example process of an acid fracture treatment with an acidic retardation system.

FIG. 3 shows another example process 300 of an acid fracture treatment with an acidic retardation system. The acidic retard system can include an acidic retard agent configured to reduce the reactivity of the acidic fluid. In some examples, the acidic retard agent includes a gas with low density and low viscosity such as nitrogen ($N_2$), carbon dioxide ($CO_2$), air, methane, or natural gas. In some examples, the acidic retard agent includes at least one of linearly polymer (for example, synthetic polymer like PAM, biopolymer like CHMBG, or terpolymer), crosslinked polymer system (for example, synthetic polymer like PAM, biopolymer like CHMBG, or terpolymer), viscoelastic surfactant (VES) system, or diesel or oil. The acidic fluid can be gelled by the acidic retard agent such as the linearly polymer, crosslinked polymer system, or the VES system. The acidic fluid can be emulsified by diesel or oil, for example, at different qualities.

Fracturing of a subterranean formation in which a wellbore is formed is initiated to create a formation fracture (302). After initiating the fracturing for a period of time, an acidic fluid is injected into the wellbore to etch walls of the formation fracture to thereby create fracture conductivity (304). Steps 302 and 304 are similar to steps 202 and 204 of FIG. 2, respectively.

The acidic retard system is introduced into the wellbore to reduce reactivity of the acidic fluid in the wellbore (306). The acidic retard system can be introduced throughout the treatment, for example, after the creation of the formation fracture and until completion of the treatment.

Reaction of the fracture to the acidic fluid and the acidic retard system is monitored during the treatment (308), and a foam quality of fluids in the wellbore is controlled based on the monitored reaction (310). The foam quality is based on the introduced acidic retard system. The acid retard system can include viscosified acid, emulsified acid, or an acid system in the diverter stage. Different acidic retard systems can form different foam qualities. For example, emulsified acid systems that are diesel based tend to destabilize foams comparative to viscosified acid systems. With a particular acidic retard system, a corresponding foam quality can be determined and controlled.

Controlling the foam quality of the fluids in the wellbore can include increasing the foam quality with time during the treatment, for example, by adjusting at least one of an injection rate of the acidic fluid, an injection volume of the acidic fluid, an introduction rate of the acidic retard system, an introduction volume of the acidic retard system, or an introduction concentration of an acidic retard agent in the acidic retard system. For example, the concentration of the acidic retard agent can be changed with time to increase the retardation.

The acid fracture treatment with foaming by gases (or acidic retardation system) as described herein can reduce a total required acid volume, for example, from an acid volume 1200-1250 gals/ft. to 500-700 gals/ft. Foaming can lead to better acid retardation to achieve deeper acid penetration, an increase of acid diversion efficiency, a reduction of a leak-off rate, and improved solids transport (for example, for solid diverter), which enables to get a higher apparent viscosity. The acid fracture treatment can also achieve better clean-up, because gas such as nitrogen can reduce the overall acid density to allow natural flow back for depleted reservoirs (without a need for any additional gas lifting technique, precipitates can be lifted with flowback, and gas lifting after the treatment can be eliminated. Wells treated with the gas foaming shows a faster clean-up after treatment compared to wells treated without gas foaming. The acid fracture treatment can also reduce formation damage, minimize well shut-in time as there is no need to have closed fracture acidizing (CFA) treatment, and achieve better control/uniform acid coverage. The acid fracture treatment can achieve lower bottomhole treatment pressures, higher post acid fracture productivity and thus production rates, reduced site time, saved costs on gas lifting operations with coiled tubing, and saved fresh water required per treatment. The acid fracture treatment can also achieve better reservoir coverage due to better diversion, deeper acid penetration, less hydraulic horse power and surface lines required.

Examples of Acid Fracture Treatments

Table 1 shows steps of an example acid fracture treatment without gas foaming.

TABLE 1 an acid fracture treatment without gas foaming

| Step Name | Pump Rate (bbl/min) | Fluid Name | Step Fluid Volume (gal) | Acid Conc. (%) |
|---|---|---|---|---|
| PAD 1 | 20.0 | DBXF | 3500 | 0.0 |
| Acid 1 | 20.0 | Emulsified acid | 4000 | 28.0 |
| PAD 2 | 25.0 | DBXF | 1500 | 0.0 |
| Diverter 1 | 25.0 | Particulates | 1500 | 15.0 |
| PAD 3 | 30.0 | DBXF | 3500 | 0.0 |
| Acid 2 | 30.0 | HCl | 4500 | 28.0 |
| PAD 4 | 35.0 | DBXF | 1500 | 0.0 |
| Diverter 2 | 35.0 | Particulates | 1500 | 15.0 |
| PAD 5 | 36.0 | DBXF | 4000 | 0.0 |
| Acid 3 | 36.0 | HCl | 5500 | 28.0 |
| PAD 6 | 40.0 | DBXF | 1500 | 0.0 |
| Diverter 3 | 40.0 | Particulates | 2000 | 15.0 |
| PAD 7 | 45.0 | DBXF | 5000 | 0.0 |
| Acid 4 | 45.0 | HCl | 6500 | 28.0 |
| Overflush | 20.0 | Water | 10000 | 0.0 |
| Flush | 20.0 | Water | 6800 | 0.0 |

A fracturing pad fluid was first injected into a wellbore to break down a formation penetrated by the wellbore. The pad fluid was a water-based pad, for example, a gelled water or crosslinked gel fluid such as delayed borate xlinked fluid (DBXF). The pad fluid delayed borate xlinked fluid was pumped at a rate of 20.0 barrel per minute (bbl/min) and the total fluid volume in step PAD 1 was about 3500 Gallons (gals). The pad fluid was pumped into the wellbore to create a fracture with a desired height, width, length, or any suitable combination therefrom. For example, the created fracture can have a volume that is around 10-20% of a total pumped volume of the pad fluid.

Once the desired values of created fracture dimensions were achieved, an acid fluid was injected into the wellbore to etch walls of the fracture to create fracture conductivity. The acid fluid includes emulsified with an acid concentration of 28.0 wt. %.

A diverter (a diversion fluid or a diversion agent) was added to the acid fluid to minimize fluid leakoff inside the formation and keep the acid reaction with fracture faces. The diverter may include particulates with an acid concentration of 15.0%.

The pad fluid, the acid fluid, and the diverter were alternately injected into the wellbore, as illustrated in Table 1. The acid fracture treatment includes a number of sequential steps: PAD 1, Acid 1, PAD 2, Diverter 1, PAD 3, Acid 2, PAD 4, Diverter 2, PAD 5, Acid 3, PAD 6, Diverter 3, PAD7, and Acid 4. Each of the pad fluids, the acid fluids, and the diverters was varied the pump (or injection) rate and the step fluid volume (that is, a fluid volume pumped in a step). For example, the pump rate of the pad fluid was increasing with time during the treatment, while the step fluid volume of the pad fluid was changed for different steps, within a range from 1,500 Gallons to 5,000 Gallons.

In the acid fracture treatment of Table 1, the acid fluid during the main acid stages (for examples, steps Acid 1, Acid 2, and Acid 3) was injected (or pumped) at a pressure higher than a fracture closure pressure that can lead to a closure of the fracture, and the acid reacted with the fracture face at open conditions. To keep the pressure constant, as illustrated in Table 1, the injection rate (or the pump rate) of the acid fluid was kept increasing with time, for example, from 20.0 bbl/min to 45.0 bbl/min. The step fluid volume of the acid fluid was also kept increasing with time, for example, from 4,000 Gallons to 6,500 Gallons. The pump rate of the diverter was also kept increasing with time to provide sufficient diversion for the increased acid fluid, for example, from 25.0 bbl/min to 40.0 bbl/min. The step fluid volume of the diverter was also increased from 1,500 Gallons to 2000 Gallons.

At a closed-fracture acid step (Acid 4), 28.0 wt % hydrochloric (HCl) acid was pumped below the fracture closure pressure. Then, the wellbore and the fracture was cleaned by flushing fluid, for example, water. The treatment includes an overflush step and a final flush step.

In the wellbore, the injected (or pumped) acid volumes varied from 1,500 to 2,000 gal/ft. After long-term production and the usage of emulsified acids, in-situ-gelled acids, formic acid/HCl, or viscoelastic acids, the acid volumes were reduced to 450 gals/ft.

FIG. 4A shows an example time diagram 400 of the acid fracture treatment of Table 1. Curve 402 shows a treating pressure applied during injecting the fluids (for example, the pad fluid, the acid fluid, the diverter, and the flushing fluid) into the wellbore. Curve 404 shows a slurry rate in the wellbore. Curve 406 shows a bottomhole (BH) pressure Curve 408 shows an annulus pressure. The X axis shows the time, the left Y axis is for the treating pressure (pound per square inch, psi), and the right Y axis is for the slurry rate (bbl/min).

Table 2 shows steps of an example acid fracture treatment with gas foaming.

TABLE 2 an acid fracture treatment with gas foaming

| Step Name | Rate (bbl/min) | Fluid Name | Volume (gal) | $N_2$ Rate (scf/min) | $N_2$ Volume (gal) | Foam Quality (%) |
|---|---|---|---|---|---|---|
| Cool Down | 10 | Treated Water | 500 | 0 | 0 | 0 |
| Spearhead | 15 | 26% HCl | 3000 | 0 | 0 | 0 |
| PAD 1 | 25 | Xlinked gel | 1500 | 0 | 0 | 0 |
| Acid 1 | 30 | 26% HCl | 4500 | 0 | 0 | 0 |
| PAD 2 | 35 | Xlinked gel | 1500 | 4000 | 44 | 5 |
| Diverter 1 | 20 | VES | 1500 | 4000 | 77 | 10 |
| PAD 3 | 15 | Xlinked gel | 1800 | 4000 | 123 | 15 |
| Acid 2 | 15 | 26% HCl | 5500 | 5500 | 516 | 20 |
| PAD 4 | 20 | Xlinked gel | 1500 | 6500 | 125 | 25 |
| Diverter 2 | 15 | VES | 2000 | 6500 | 222 | 30 |
| PAD 5 | 12 | Xlinked gel | 1800 | 6500 | 250 | 35 |
| Acid 3 | 10 | 26% HCl | 6000 | 6500 | 998 | 39 |
| PAD 6 | 8 | Xlinked gel | 1500 | 6500 | 312 | 45 |
| Diverter 3 | 7 | VES | 2000 | 6500 | 475 | 49 |
| PAD 7 | 5 | Xlinked gel | 1800 | 6500 | 599 | 60 |
| Acid 4 | 5 | 26% HCl | 7000 | 6500 | 2330 | 65 |
| Overflush | 5 | Treated Water | 2500 | 7000 | 896 | 70 |
| Flush | 5 | Treated Water | 3500 | 8000 | 1434 | 78 |

The wellbore was first cooled down with treated water. Then an initial fracturing fluid was provided to initial penetration into the formation during a spearhead step. The initial fluid includes an acid with a relatively low viscosity, for example, 26% HCl.

Then, a fracturing pad fluid, for example, a gelled water or crosslinked gel fluid such as xlinked gel, was injected into the wellbore to break down the formation to initiate a fracture. Once desired values of the created fracture dimensions were achieved, an acid fluid, for example, 26% HCl, was pumped into the wellbore to etch walls of the fracture to create fracture conductivity. Also a diverter (or diversion fluid), for example, viscoelastic surfactants (VES), was also added to the acid fluid to minimize fluid leakoff inside the formation and keep the acid reaction with fracture faces.

Similar to the acid fracture treatment of Table 1, the pad fluid, the acid fluid, and the diverter were alternately injected into the wellbore in any suitable order. As illustrated in Table 2, the acid fracture treatment includes a number of sequential steps: PAD 1, Acid 1, PAD 2, Diverter 1, PAD 3, Acid 2, PAD 4, Diverter 2, PAD 5, Acid 3, PAD 6, Diverter 3, PAD7, Acid 4, Overflush, and Flush.

One of the differences between the treatment of Table 2 and the treatment of Table 1 is that a gas (for example, nitrogen $N_2$) was introduced for foaming the fluids in the early stages of the treatment until the end of the treatment, for example, from step PAD 2 to step Flush.

During the treatment, the foam quality was controlled to increase with time, for example, from 0 to 78%, as illustrated in Table 2. Reaction of the fracture in the wellbore was monitored to the acid fluid during the treatment, and the increase of the foam quality was controlled based on the monitored reaction, for example, by adjusting at least one of the introduction rate of the gases, the introduction volume of the gases, the injection rate of the acid fluid, or the injection volume of the acid fluid.

As illustrated in Table 2, during the treatment, the introduction rate of the $N_2$ gases was increased from 4,000 scf/min to 8,000 scf/min. The step introduction volume of the $N_2$ gases varied within a range of 44 Gallons to 2330 Gallons. The total acid injection rate was reduced with time, which leaded to achieve fracture closure during main acid treatment (for example, from step Acid 1 to step Acid 4). The acid fluid was injected at a pressure lower than a fracture closure pressure. The injection rate of the acid fluid was reduced from 30 bbl/min to 5 bbl/min. Therefore, a majority of the acid was consumed while the fracture was closed.

FIG. 4B shows an example time diagram 450 of the acid fracture treatment of Table 2. Curve 452 shows a treating pressure (applied during injecting the fluids (for example, the pad fluid, the acid fluid, the diverter, and the flushing fluid) and gases into the wellbore. Curve 454 shows a slurry rate in the wellbore. Curve 456 shows a predicted BH Internal Phase, where curve 458 shows a BH Internal Phase and curve 460 shows a calculated BH pressure. Curve 462 shows $N_2$ standard injection rate. Curve 464 shows a wellhead Internal Phase, and curve 466 shows a wellhead rate. The X axis shows the treatment time, the left A axis can be used as pressure values (pounds per square inch gauge, psig) for the treating pressure and the calculated BH pressure or as injection rates (standard cubic feet per minute, scfm) for $N_2$ standard rate. The right B axis can be used as fluidic flowing rates (barrels per minute, bpm) for the slurry rate and the wellhead rate. The right G axis is used as percentages (%) for the predicted BH Internal Phase, the BH Internal Phase, and the wellhead Internal Phase.

During the treatment, a wellhead foam quality can be calculated based on actual wellhead pressure and temperature (refereed as a wellhead Internal Phase). BH Internal Phase was calculated based on calculated BH pressure and temperature in real time, and an actual BH foam quality can be calculated based on the calculated BH Internal Phase. Predicted BH Internal Phase was calculated in real time, which can be used to predict a bottomhole foam quality. The foam quality can be predicted and controlled dynamically based on the calculated wellhead foam quality, the calculated actual bottomhole foam quality, and the predicted bottomhole foam quality.

Table 3 shows a comparison between two wells (Wells# A &B) using different technologies. Well# A was treated using the acid fracture treatment without gas foaming, similar to that of Table 1, while well# B was treated using the acid fracture treatment with gas foaming, similar to that of FIG. 2, and Table 2. Wells# A and B were located in the same area with substantially identical parameters:

(i) net pad thickness of 55 ft. for both wells, (ii) average open hole section per stage: 942 ft. for well# A and 918 ft. for well# B ft., (iii) reservoir porosity around 5% for both wells.

TABLE 3

Comparison of wells# A&B under different treatments

| Well No. | A | B |
| --- | --- | --- |
| Technology | Acid fracture Treatment without gas foaming | Acid fracture treatment with gas foaming |
| Acid Volume per stage (gals) | 23,688 | 25,795 |
| Diverter volume per stage (gals) | 7,454 | 3,862 |
| Total $N_2$ Acid Frac. per stage (gals) | 0 | 6,925 |
| Total $N_2$ to lift post Acid Frac. (gals) | 6,000 | 0 |
| Production Post Acid Frac. (MMSCFD) | 0.0 | 18.7 |
| FWHP Post Acid Frac. (psi) | 0 | 2,316 |
| Reservoir pressure (psi) | 3,850 | 3,320 |

Based on data shown in Table 3, for well# A treated with the acid fracture treatment without gas foaming, 23,688 gals of reactive acid system and 7,454 gals of diverter system were injected, followed by 6000 gals of $N_2$ as gas lifting method to reduce the hydrostatic pressure for a better flow back. However, gas production after the treatment was zero (that is, well considered dead), as the treatment fluid killed the well and gas lifting was not able to initiate the production.

In comparison, for well# B treated with the acid fracture treatment with gas foaming, 25,795 gals of reactive acid system and 3,862 gals of diverter system were injected with 6,925 gals of $N_2$ for foaming purpose (not as gas lifting technique where gas is pumped after the treatment). Post-fracture production data shows that Well B produced an 18.7 Million standard cubic feet per day (MMSCFD) with a wellhead pressure of 2,316 psi. Well B followed back naturally after the treatment without the need of any additional gas lifting technique. The reservoir pressure for well# B (3,320 psi) is lower than well# A (3,850) by about 500 psi. This shows the treatment with gas foaming can enhance the well productivity compared to the treatment without gas foaming.

Table 4 shows another comparison between two wells (wells# C & D) using different technologies. Well# C was treated using the acid fracture treatment similar to that of Table 1 except that, at the end of the treatment, $N_2$ was pumped for foaming, while well# D was treated using the acid fracture treatment with gas foaming, similar to that of FIG. 2 or Table 2. Wells# C and D were located in the same area with substantially identical parameters:

(i) net pad thickness of 55 ft. for both wells, (ii) average open hole section per stage: 724 ft. for well# C and 652 ft. for well# D, (iii) reservoir porosity around 8.5% for well# C and 5% for well#vD.

TABLE 4

Comparison of wells# C&D under different treatments

| Well No. | C | D |
|---|---|---|
| Technology | Acid fracture treatment with $N_2$ foaming at the end of the treatment | Acid fracture treatment with $N_2$ foaming throughout the treatment |
| Acid Volume per stage, gals | 29,569 | 24,445 |
| Diverter volume per stage, gals | 7,622 | 4,073 |
| Total $N_2$ Acid Frac. per stage, gals | 2,274 | 7,450 |
| Total $N_2$ to lift post Acid Frac., gals | 0 | 0 |
| Production Post Acid Frac., MMSCFD | 5.0 | 15.6 |
| FWHP Post Acid Frac., psi | 1,530 | 2,997 |
| Reservoir pressure, psi | 5,156 | 4,150 |

Based on data shown in Table 4, for well # C, a 29,569 gals of reactive acid system and 7,622 gals of diverter system were injected with a 2,274 gals of $N_2$ as foaming fluid at the end of the treatment similar to the treatment of FIG. 2 and Table 2. Well# C was able to naturally produce after the treatment with a 5 MMSCFD with a wellhead pressure of 1,530 psi.

In comparison, for well# D, 24,445 gals of reactive acid system and 4,073 gals of diverter system were injected with 7,450 gals of $N_2$ for foaming purpose (not as gas lifting technique that is pumped after the treatment). Well# D produced a 15.6 MMSCFD with a wellhead pressure of 2,997 psi. Well# D followed back naturally after the treatment without the need of any additional gas lifting technique. Also the reservoir pressure for well# D (4150 psi) is lower than well# C (5156) by almost 1,000 psi. This shows that the acid fracture treatment with gas foaming can enhance the productivity of the well compared to the treatment without gas foaming.

The earlier provided description of example implementations does not define or constrain this specification. Other changes, substitutions, and alterations are also possible without departing from the spirit and scope of this specification. Accordingly, other embodiments are within the scope of the following claims.

The invention claimed is:

1. A method of acid fracture treatment, comprising:
   initiating fracturing of a subterranean formation in which a wellbore is formed to create a formation fracture;
   after initiating the fracturing for a period of time, determining that a dimension of the created formation fracture reaches a value, and in response, injecting an acidic fluid into the wellbore to etch walls of the formation fracture to thereby create fracture conductivity;
   introducing a gas into the wellbore to foam fluids in the wellbore; and
   increasing a foam quality of the fluids with time during the treatment, wherein the foam quality is based on a volume of the introduced gas and a volume of the fluids in the wellbore.

2. The method of claim 1, further comprising:
   monitoring reaction of the fracture to the acidic fluid during the treatment; and
   controlling the increasing of the foam quality based on the monitored reaction by adjusting at least one of an injection rate of the acidic fluid, an injection volume of the acidic fluid, an introduction rate of the gas, or an introduction volume of the gas.

3. The method of claim 2, wherein monitoring reaction of the fracture comprises:
   monitoring at least one of parameters including a treating pressure, a wellhead pressure, a bottomhole pressure, a fluid pumping rate, a gas pumping rate, and a slurry rate; and
   determining the reaction of the fracture based on the monitored parameters.

4. The method of claim 1, further comprising:
   calculating the foam quality based on the volume of the introduced gas and the volume of the fluids in the wellbore; and
   correcting the calculated foam quality with at least one of a calculated wellhead foam quality, a predicted bottomhole foam quality, or a calculated actual bottomhole foam quality.

5. The method of claim 4, further comprising:
   calculating the calculated wellhead foam quality based on an actual wellhead pressure and a temperature;
   predicting the predicted bottomhole foam quality based on a predicted bottomhole internal phase; and
   calculating the calculated actual bottomhole foam quality based on a calculated bottomhole internal phase that is calculated based on a bottomhole pressure and the temperature.

6. The method of claim 1, wherein introducing the gas comprises:
   introducing the gas after the creation of the formation fracture and until completion of the treatment.

7. The method of claim 1, further comprising:
   decreasing an injection rate of the acidic fluid with time during the treatment.

8. The method of claim 1, wherein injecting the acidic fluid comprises:
   injecting the acidic fluid at a pressure lower than a fracture closure pressure that is capable of causing a closure of the formation fracture.

9. The method of claim 8, wherein injecting the acidic fluid comprises:
   keeping an injection rate of the acidic fluid constant with time during the treatment.

10. The method of claim 8, wherein injecting the acidic fluid comprises:
    increasing an injection rate of the acidic fluid with time during the treatment.

11. The method of claim 1, wherein initiating the fracturing comprises:
    flowing a fracturing pad fluid into the wellbore to break down the formation to thereby create the formation fracture.

12. The method of claim 11, comprising alternately performing steps of injecting the fracturing pad fluid and the acidic fluid, while keeping introducing the gas during the steps.

13. The method of claim 12, wherein a volume of the introduced gas for a current step is no smaller than a volume of the introduced gas for a previous step.

14. The method of claim 12, wherein a volume of the introduced gas for a current step is smaller than a volume of the introduced gas for a previous step.

15. The method of claim 12, wherein an injection rate of the introduced gas for a current step is no smaller than an injection rate of the introduced gas for a previous step.

16. The method of claim 11, wherein the fracturing pad fluid comprises at least one of a gelled water or a crosslinked gel fluid.

17. The method of claim 1, wherein introducing a gas into the wellbore comprises:
generating the gas in-situ in the fluids in the wellbore.

18. The method of claim 1, wherein the acidic fluid is configured to dissolve the formation and comprises at least one of:
hydrochloric (HCl) acid with a concentration from 0.1 to 32 wt. %,
formic acid with a concentration from 0.1 to 12 wt. %,
acetic acid with a concentration from 0.1 to 20 wt. %,
methaneseleninic (MSA) acid with a concentration from 0.1 to 92 wt. %,
chelating agent with a concentration from 0.1 to 40 wt. %, or
a carboxylic acid system.

19. The method of claim 1, wherein the acidic fluid is configured to be
gelled by linearly polymers,
gelled by crosslinked polymer system,
gelled by viscoelastic surfactant (VES) system,
emulsified by diesel or oil, or
foamed by a particular gas.

20. The method of claim 1, wherein the introduced gas has low density and low viscosity and comprises at least one of:
nitrogen ($N_2$),
carbon dioxide ($CO_2$),
air,
methane, or
natural gas.

21. The method of claim 1, further comprising:
adding a diversion fluid to the acidic fluid, wherein the diversion fluid comprises at least one of a crosslinking polymer, a surfactant based material, or a crosslinked non-reactive fluid.

22. The method of claim 1, further comprising:
cleaning the wellbore after closure of the formation fracture.

23. A method of acid fracture treatment, comprising:
initiating fracturing of a subterranean formation in which a wellbore is formed to create a formation fracture;
after initiating the fracturing for a period of time, determining that a dimension of the created formation fracture reaches a value, and in response, injecting an acidic fluid into the wellbore to etch walls of the formation fracture to thereby create fracture conductivity;
introducing into the wellbore an acidic retard system configured to reduce reactivity of the acidic fluid in the wellbore;
monitoring reaction of the fracture to the acidic fluid and the acidic retard system during the treatment; and
controlling a foam quality of fluids in the wellbore based on the monitored reaction, wherein the foam quality is based on the introduced acidic retard system.

24. The method of claim 23, wherein controlling a foam quality of fluids in the wellbore comprises:
increasing the foam quality with time during the treatment.

25. The method of claim 23, wherein controlling a foam quality of fluids in the wellbore comprises:
adjusting at least one of an injection rate of the acidic fluid, an injection volume of the acidic fluid, an introduction rate of the acidic retard system, an introduction volume of the acidic retard system, or an introduction concentration of an acidic retard agent in the acidic retard system.

26. The method of claim 23, wherein the acidic retard system comprises an acidic retard agent that includes at least one of:
a gas with low density and low viscosity,
linearly polymer,
crosslinked polymer system,
viscoelastic surfactant (VES) system, or
diesel or oil.

* * * * *